(12) United States Patent
Koch et al.

(10) Patent No.: US 10,389,804 B2
(45) Date of Patent: Aug. 20, 2019

(54) INTEGRATION OF CONTENT CREATION AND SHARING

(71) Applicant: Adobe Inc., San Jose, CA (US)

(72) Inventors: Zeke Koch, San Francisco, CA (US); Gavin Stuart Peter Miller, Los Altos, CA (US); Jonathan W. Brandt, Santa Cruz, CA (US); Nathan A. Carr, San Jose, CA (US); Radomir Mech, Mountain View, CA (US); Walter Wei-Tuh Chang, San Jose, CA (US); Scott D. Cohen, Sunnyvale, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/938,660

(22) Filed: Nov. 11, 2015

(65) Prior Publication Data

US 2017/0131877 A1    May 11, 2017

(51) Int. Cl.
| | | |
|---|---|---|
| *G06F 3/0484* | (2013.01) | |
| *G06F 21/62* | (2013.01) | |
| *G06T 11/00* | (2006.01) | |
| *H04L 29/08* | (2006.01) | |
| *G06Q 20/12* | (2012.01) | |
| *G06T 11/60* | (2006.01) | |
| *G06F 21/10* | (2013.01) | |

(52) U.S. Cl.
CPC .......... *H04L 67/1074* (2013.01); *G06F 21/10* (2013.01); *G06F 21/6218* (2013.01); *G06Q 20/1235* (2013.01); *G06T 11/001* (2013.01); *G06T 11/60* (2013.01); *G06T 2200/24* (2013.01)

(58) Field of Classification Search
CPC ............ G06F 3/04845; G06F 21/6218; G06Q 20/1235; G06T 11/60; G06T 11/001; G06T 2200/24; H04L 67/1074
See application file for complete search history.

(56) References Cited

U.S. PATENT DOCUMENTS

| | | | |
|---|---|---|---|
| 6,011,864 | A | 1/2000 | Wu et al. |
| 7,660,464 | B1 | 2/2010 | Peterson |
| 8,341,195 | B1 | 12/2012 | Cole et al. |
| 8,532,377 | B2 | 9/2013 | Skaff et al. |
| 8,775,424 | B2 | 7/2014 | Skaff et al. |
| 9,111,413 | B2 | 8/2015 | Gagner et al. |
| 9,219,830 | B1 | 12/2015 | Ciorba et al. |

(Continued)

OTHER PUBLICATIONS

"Pre-Interview Communication", U.S. Appl. No. 14/938,628, dated Mar. 22, 2017, 3 pages.

(Continued)

*Primary Examiner* — Tapas Mazumder
(74) *Attorney, Agent, or Firm* — SBMC

(57) ABSTRACT

Content creation and sharing integration techniques and systems are described. In one or more implementations, techniques are described in which modifiable versions of content (e.g., images) are created and shared via a content sharing service such that image creation functionality used to create the images is preserved to permit continued creation using this functionality. In one or more additional implementations, image creation functionality employed by a creative professional to create content is leveraged to locate similar images from a content sharing service.

20 Claims, 9 Drawing Sheets

(56) References Cited

U.S. PATENT DOCUMENTS

| | | | |
|---|---|---|---|
| 9,449,521 | B2 | 9/2016 | Dahlkvist et al. |
| 9,483,159 | B2 | 11/2016 | Myslinski |
| 9,569,697 | B1 | 2/2017 | McNerney et al. |
| 9,594,807 | B2 | 3/2017 | Rappoport et al. |
| 9,818,044 | B2 | 11/2017 | Koch et al. |
| 9,916,538 | B2 | 3/2018 | Zadeh et al. |
| 10,198,590 | B2 | 2/2019 | Koch et al. |
| 10,249,061 | B2 | 4/2019 | Koch et al. |
| 2002/0118210 | A1* | 8/2002 | Yuasa ............... H04N 1/6052 345/589 |
| 2003/0084065 | A1 | 5/2003 | Lin et al. |
| 2004/0085330 | A1 | 5/2004 | Walker, Jr. et al. |
| 2005/0030315 | A1 | 2/2005 | Cohen et al. |
| 2005/0080771 | A1 | 4/2005 | Fish |
| 2009/0119756 | A1 | 5/2009 | Acuna et al. |
| 2009/0287657 | A1 | 11/2009 | Bennett |
| 2010/0296748 | A1 | 11/2010 | Shechtman et al. |
| 2011/0101104 | A1 | 5/2011 | Flynn et al. |
| 2011/0102544 | A1* | 5/2011 | Kim ................... H04N 13/0029 348/43 |
| 2011/0184950 | A1 | 7/2011 | Skaff et al. |
| 2011/0263946 | A1 | 10/2011 | el Kaliouby et al. |
| 2012/0054638 | A1* | 3/2012 | Ingoldby ............. G06F 17/3089 715/751 |
| 2012/0163710 | A1 | 6/2012 | Skaff et al. |
| 2012/0206471 | A1* | 8/2012 | Sarnoff ............... G06T 11/60 345/581 |
| 2012/0257814 | A1 | 10/2012 | Kohli et al. |
| 2012/0317657 | A1 | 12/2012 | Glimcher et al. |
| 2013/0019257 | A1 | 1/2013 | Tschernutter et al. |
| 2013/0070050 | A1* | 3/2013 | Ha ........................ H04N 5/144 348/43 |
| 2013/0246277 | A1 | 9/2013 | Moseley et al. |
| 2014/0108931 | A1 | 4/2014 | Howard et al. |
| 2014/0129942 | A1 | 5/2014 | Rathod |
| 2014/0177966 | A1 | 6/2014 | Hamid et al. |
| 2014/0201126 | A1 | 7/2014 | Zadeh et al. |
| 2014/0211034 | A1* | 7/2014 | Tanaka ................ G06T 5/002 348/218.1 |
| 2014/0229873 | A1 | 8/2014 | Tremblay et al. |
| 2014/0333739 | A1 | 11/2014 | Yang et al. |
| 2015/0116353 | A1 | 4/2015 | Miura et al. |
| 2015/0193507 | A1 | 7/2015 | Rappoport et al. |
| 2015/0279224 | A1 | 10/2015 | Dahlkvist et al. |
| 2015/0324394 | A1 | 11/2015 | Becker et al. |
| 2016/0055237 | A1 | 2/2016 | Tuzel et al. |
| 2016/0259992 | A1* | 9/2016 | Knodt ................. G06K 9/6201 |
| 2017/0011489 | A1 | 1/2017 | Van Leeuwen et al. |
| 2017/0131876 | A1 | 5/2017 | Koch et al. |
| 2017/0132252 | A1 | 5/2017 | Koch et al. |
| 2017/0132290 | A1 | 5/2017 | Koch et al. |
| 2017/0132425 | A1 | 5/2017 | Koch et al. |
| 2017/0132490 | A1 | 5/2017 | Koch et al. |

OTHER PUBLICATIONS

"Pre-Interview Communication", U.S. Appl. No. 14/938,628, dated Apr. 3, 2017, 3 pages.

"Non-Final Office Action", U.S. Appl. No. 14/938,781, dated Mar. 10, 2017, 9 pages.

"First Action Interview Office Action", U.S. Appl. No. 14/938,628, dated Jul. 26, 2017, 3 pages.

"Notice of Allowance", U.S. Appl. No. 14/938,781, dated Jul. 12, 2017, 7 pages.

"Final Office Action", U.S. Appl. No. 14/938,628, dated Dec. 7, 2017, 28 pages.

"Restriction Requirement", U.S. Appl. No. 14/938,724, dated Jan. 8, 2018, 5 pages.

"Non-Final Office Action", U.S. Appl. No. 14/938,724, dated Apr. 9, 2018, 14 pages.

"Non-Final Office Action", U.S. Appl. No. 14/938,690, dated Feb. 15, 2018, 20 pages.

"Notice of Allowance", U.S. Appl. No. 14/938,724, dated Oct. 19, 2018, 13 pages.

"Final Office Action", U.S. Appl. No. 14/938,690, dated Nov. 2, 2018, 19 pages.

"Non-Final Office Action", U.S. Appl. No. 14/938,628, dated May 10, 2018, 27 pages.

"Non-Final Office Action", U.S. Appl. No. 14/938,752, dated Jun. 29, 2018, 29 pages.

"Corrected Notice of Allowance", U.S. Appl. No. 14/938,628, dated Jan. 17, 2019, 7 pages.

"Final Office Action", U.S. Appl. No. 14/938,752, dated Dec. 14, 2018, 46 pages.

"Notice of Allowance", U.S. Appl. No. 14/938,628, dated Dec. 11, 2018, 10 pages.

* cited by examiner

400 

402
Receive one or more inputs specifying a search request for one or more images that are to be included as part of content creation

404
Responsive to communication of the search request to a content sharing service, receiving a search result from the content sharing service that includes representations of the one or more images as available for licensing based on the search performed using the search request

406
Responsive to provision of credentials that are verifiable for licensing of at least one of the images from the content sharing service, receive a package that includes the at least one image along with image creation functionality data that describes image creation functionality that is used to create the at least one image and usable continue use of the image creation functionality as part of creation of the content

Fig. 4

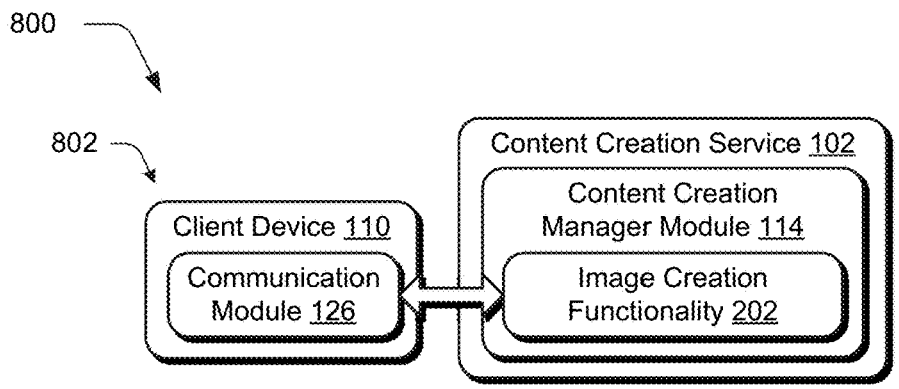
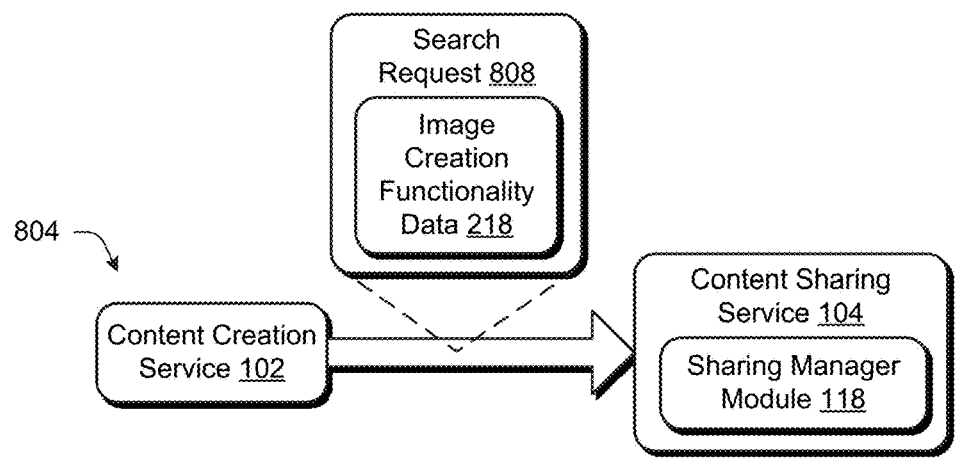
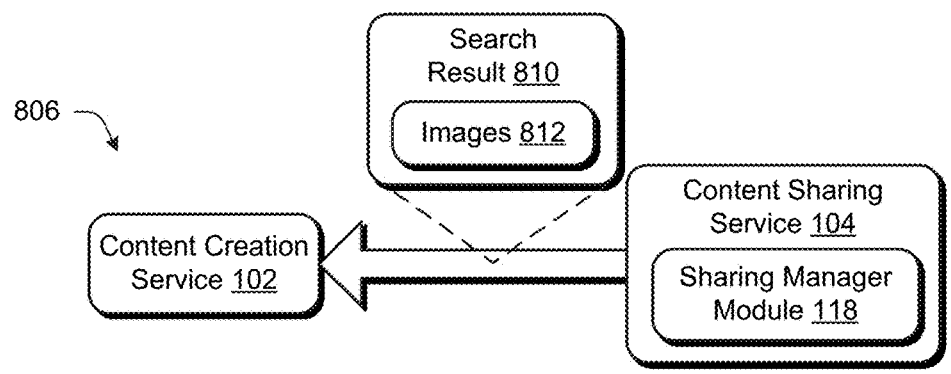
Fig. 8

INTEGRATION OF CONTENT CREATION AND SHARING

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. In one such example, a creative professional captures an image of a coworkers conversing next to a watercooler. The image is then uploaded and tagged for availability as part of the content sharing service such that a marketing professional performing a search for "office" and "watercooler" may locate the image. The content sharing service also includes functionality to make the image available for licensing in response to payment of a fee, e.g., as part of a subscription service, pay per use, and so forth.

Oftentimes, the images obtained by users of the content sharing service are to be used as part of content creation, such as for inclusion with other images as part of marketing material, a slide presentation, and so forth. Accordingly, in such a situation the user interacts with the content sharing service to locate images that are consistent with the content being created. In conventional content sharing services, however, this search is performed manually by a user using keywords to locate tagged images as described above. The user is then forced to manually navigate through the images to locate the images that exhibit consistency with the content being created, which is inefficient, time consuming, and frustrating.

Additionally, images obtained from conventional content sharing services are typically provided as a final formatted form that is not configured for modification or further creation by a user, e.g., a bitmap, jpeg, and so forth. Accordingly, a user is typically forced to deconstruct or further process these images to modify the image, such as to extract an object of interest, which can introduce errors, is inefficient, and abandons potentially useful information involved in the creation of the image.

SUMMARY

Content creation and sharing integration techniques and systems are described. In one or more implementations, modifiable versions of content (e.g., images) are created and shared via a content sharing service such that image creation functionality used to create the images is preserved to permit continued creation using this functionality. The content sharing service, for instance, may make a package available that includes the image as well as image creation functionality used to create the image. A user licensing the image may then leverage this data to continue modification/creation of the image, such as to employ layers, semantic labels, depth maps, and so on. As such, this functionality need not be recreated by a creative professional to continue this modification.

In one or more additional implementations, image creation functionality employed by a creative professional to create content is leveraged to locate similar images from a content sharing service. For example, data describing image creation functionality such as color palettes, semantic labels, and so on is provided to a content sharing service as part of a search request to locate similar images. In this way, a likelihood that a user receives an image of interest in a search result is increased.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 depicts a procedure and FIG. 5 depicts a system in an example implementation in which image creation functionality data preserved during image creation in FIG. 2 is made available by a content sharing service.

FIG. 7 depicts a procedure and FIG. 8 depicts a system in an example implementation in which image creation functionality employed as part of content creation is leveraged in an image search.

DETAILED DESCRIPTION

Overview

Figure 1:
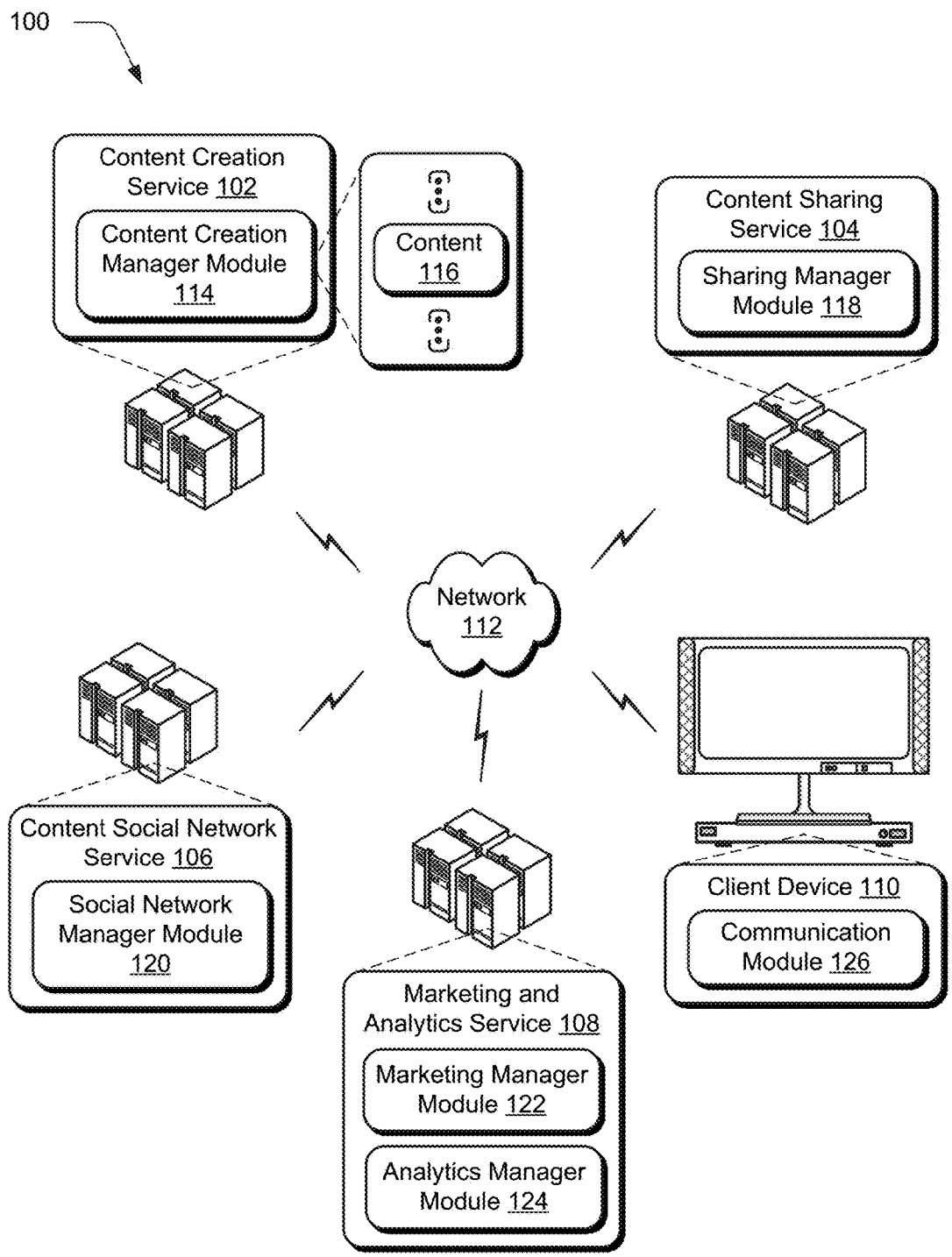
FIG. 1 is an illustration of an environment in an example implementation that is operable to employ content creation and sharing integration techniques described herein.

Content sharing services are provided via a digital environment to unite content from creative professionals with consumers of the content, such as marketers. An example of this is the content sharing service is Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

Images shared by conventional content sharing services, however, are static and inflexible in that the images are not configured to support modification of the images. For example, in order to extract an object of interest from an image for inclusion in another image, a user is typically forced to manually draw an outline of the object in the image, which is time consuming and may introduce errors based on a user's manual accuracy in following a border of the object.

To solve these and other challenges of conventional content sharing services, techniques and systems are described herein that integrate content creation and sharing. In one example, image creation functionality used to create the images is leveraged to provide a package including the image and data describing the image creation functionality such that modifications may be made to the image by leveraging how the image is created.

The image, for instance, may be created through interaction with a content creation service. Creation of the image may include use of a variety of image creation functionality such as layers, semantical labeling of objects within the image, depth maps, color palettes, and so forth by a creative professional. Data describing this functionality is included with the image as part of a package that is made available via a content sharing service for licensing. In this way, a user obtaining a license to the image may obtain this data such that access to functionality used to create the image may be made readily without reprocessing, such as to use layers or semantic labels to separate an object of interest from the image for use in content creation.

In another example, creation of the content may also be integrated with content sharing such that a user may efficiently locate images by leveraging "what the user is working on." For example, a creative professional may interact with a content creation service to create an advertisement for display in a webpage. As part of creating the advertisement, the creative professional uses a variety of image creation functionality as described above, such as color palettes, semantic labelling, depth maps, filters, and so on in order to create the advertisement as part of interacting with the service.

In order to locate additional images of interest, data describing the image creation functionality is included as part of a search request to a content sharing service. The content sharing service then leverages this data to locate images and thus increases a likelihood that the images are of interest to the creative professional. For example, use of similar color palettes and semantic labeling may be leveraged such that the images in the search result are consistent with a look-and-feel of the advertisement for the webpage. In this way, integration of the content creation with content sharing may be used to improve efficiency and accuracy of the image search. Further discussion of integration of content creation and sharing is described in the following sections and shown in corresponding figures.

In the following discussion, an example environment is first described that is configured to employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. A digital medium environment is illustrated that is configured create, shared, and use content. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 9.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. A variety of other arrangements of functionality represented by the entities of the environment 100 of FIG. 1 are also contemplated without departing from the spirit and scope thereof. Having now described an environment that is usable to implement the techniques described herein, examples of the content creation and sharing integration are described in the following.

Figure 2:
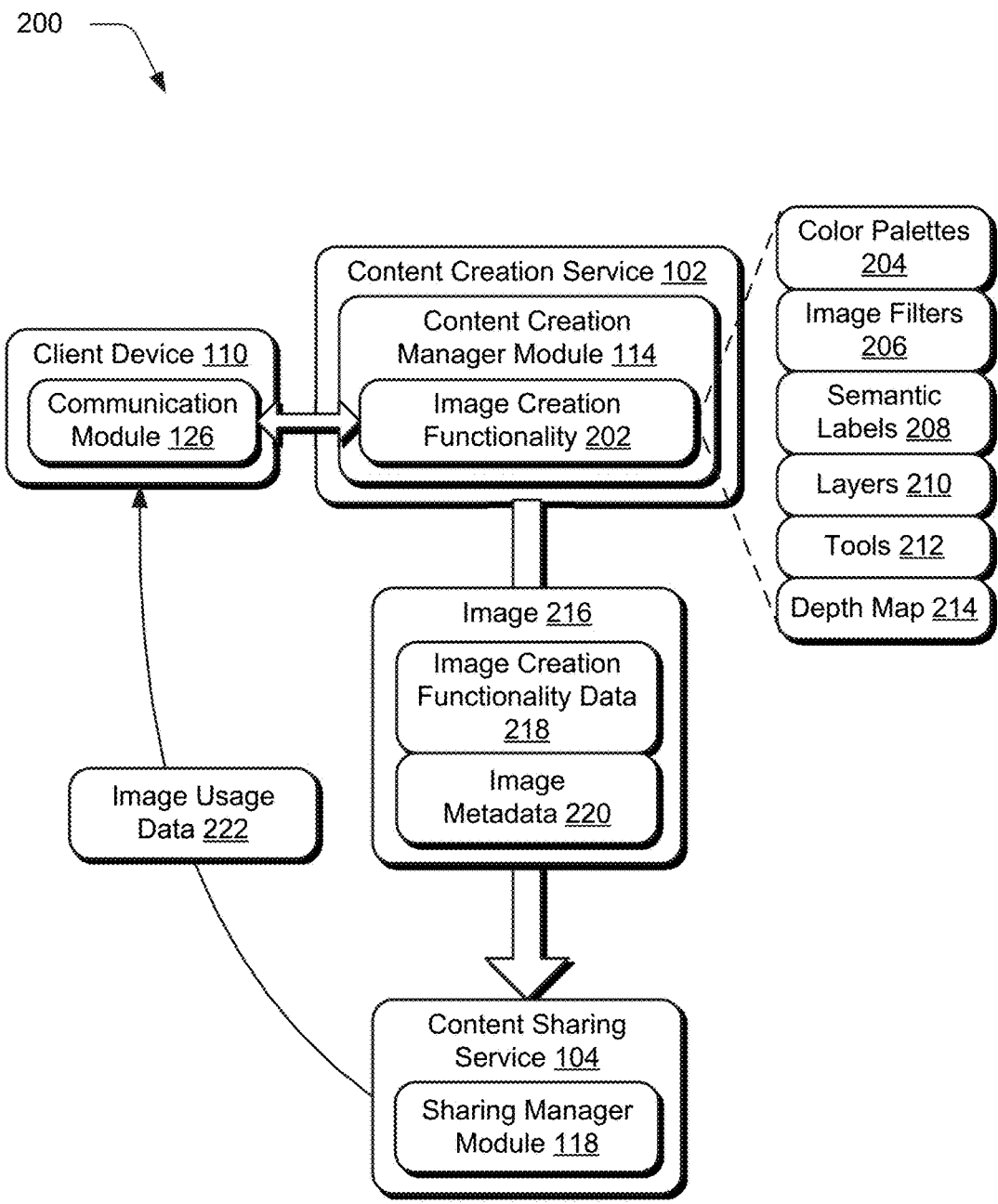
FIG. 2 depicts an example system in which images created through interaction with a content creation service are provided for licensing by a content sharing service with associated image creation functionality data.

FIG. 2 depicts an example system 200 in which images created through interaction with a content creation service 102 are provided for licensing by a content sharing service 104 with associated image creation functionality data. In this example, a creative professional uses a client device 110 and associated communication module 126 to interact with a content creation service 102. The content creation manager module 114 includes image creation functionality 202 that is accessible via a user interface to create an image 216 in this example although other types of content are also contemplated, e.g., sound data, multimedia presentations, video.

Figure 3:
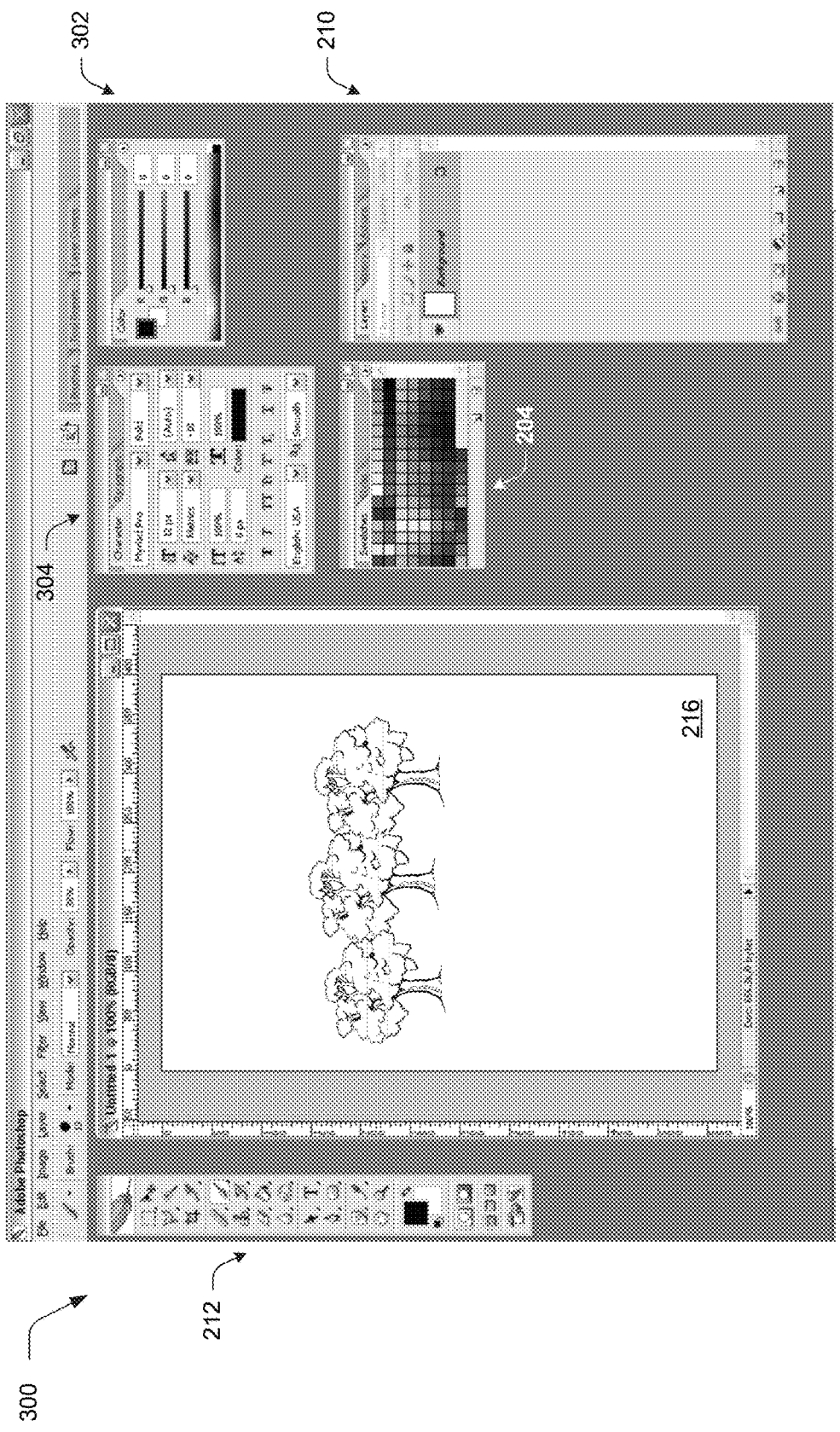
FIG. 3 depicts a user interface including examples of image creation functionality.

The image creation functionality 202 is configurable in a variety of ways and supports a variety of different techniques usable to transform an image in this instance. In one example, the image creation functionality 202 includes color palettes 204 that are used as a basis to select colors for inclusion as part of the content. As shown in a user interface 300 of FIG. 3, for instance, the color palettes 204 are usable to select colors used by brushes, to fill shapes, outlines, pen strokes, and so on. The user interface 300 may also include image creation functionality 202 to modify 302 the colors included in the palette, such as to blend colors together, specify color temperatures, and so on.

In another example, the image creation functionality 202 includes one or more image filters 206 that are applied to the image 216 to transform an appearance of the image 216. For example, the image filters may be used to apply effects such as blur, retro effects, redeye removal, motion effects, swirl effects, and so forth through modification of the colors of individual pixels of the image 216.

In a further example, the image creation functionality 202 includes semantic labels 208 that identify objects included in the image 216. The semantic labels 208, for instance, may be associated with each pixel in the image 216 to identify an object associated with the pixel. Examples of semantic labels 208 include sky, ground, standing object, type of object (e.g., car), textures, and so forth. In this way, pixels describing one object in the image may be differentiated from pixels that describe other objects in the image. Further, the semantic labels 208 describe "what is being represented" by the pixels, which may also be leveraged to support a variety of functionality, such as to suggest application of corresponding image creation functionality 202 based on a type of object represented, object removal, object duplication, and so forth.

In yet another example, the image creation functionality 202 includes layers 210 used as part of creating the image 216. As shown in the user interface 300, the layers 210 correspond to objects of the image 216, such as a background for the image 216. In this way, a user may create, interact, and modify objects individually through use of the different layers which are then displayed together (e.g., one over the other) to form the image 216.

In an additional example, the image creation functionality 202 includes image creation tools 212 used to create the image 212. Examples of such tools as shown in the user interface 300 of FIG. 3 includes user selection tools, color selection tools, cropping tools, slicing tools, clone stamping tools, brush tools, pencil tools, gradient tools, blur tools, dodge tools, path selection tools, pen tools, foreground color change tools, and others that are configured to change, select, modify, or move pixels of the image 216.

In other examples, the image creation functionality 202 includes a depth map 214 of the image 216. The depth map 214 is configured to describe a relative or absolute depth of one or more objects included in the image, which may be used to improve accuracy for object addition, removal, improvement of consistency of hole filling, scene lighting, and so forth. The depth map 214 may be virtually generated, formed using a depth sensor of an image scene captured by the image 216, based on stereo correspondence, and so forth. A variety of additional examples are also contemplated, such as to describe fonts 304 used in image creation, border, frames, and so forth.

In this system 200, the content creation manager module 114 is configured to generate and maintain image creation functionality data 218 that describes image creation functionality 202 used by the creative professional to create the image 216. The image 216, along with the image creation functionality data 218 and image metadata 220 (e.g., location information) are communicated to the content sharing service 104 to be made available as a package for licensing. In this way, the content creation manager module 114 is configured to preserve valuable information describing how the image 216 is created as well as preserve the image 216 in this modifiable state such that a user may continue creation and modification of the image 216 as desired, further discussion is described in the following and shown in corresponding figures.

Figure 5:
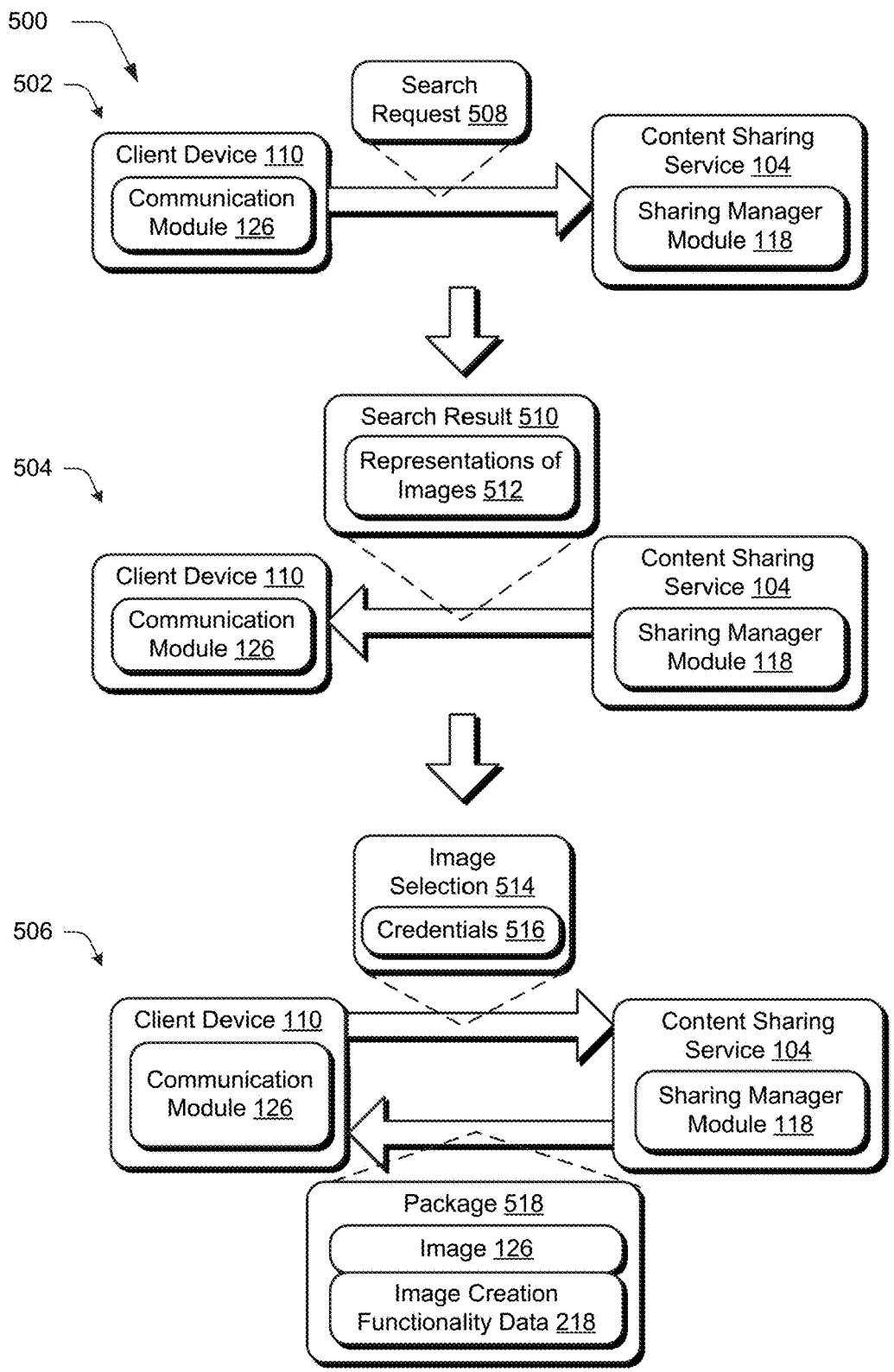

FIG. 4 depicts a procedure 400 and FIG. 5 depicts a system 500 in an example implementation in which image creation functionality data 218 preserved during image creation is made available by a content sharing service 104. FIG. 5 is depicted using first, second, and third stages 502, 504, 506. In the following, reference is made interchangeably to both FIGS. 4 and 5.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

One or more inputs are received specifying a search request for one or more images that are to be included as part of content creation (block 402), such as through interaction with a communication module 126 of a client device 110 as shown at the first stage 502. A user, for instance, may enter keywords that are to be matched to tags of images by the content sharing service 104. Accordingly, the search request 508 is formed at the client device 110 and communicated to and received by the content sharing search 104 via the network 112 of FIG. 1.

At the second stage 504, the content sharing service 104 performs a search based on the search request 508, e.g., to match keywords of the search request 508 to tags of the images available for licensing from the content sharing service 104. A search result 510 is then formed by the content sharing service that includes representations of images 512 located as having matching or corresponding tags. The representations of the images 512, for instance, may be configured to provide an indication to a user of what is included in the image but is typically not suitable for use in content creation, such as through configuration as a thumbnail, inclusion of a watermark, configured as a low-resolution version of the image, and so on.

Accordingly, the client device 110 then receives the search result 510 that includes representations of the one or more images 512 as available for licensing based on the search performed using the search request 508 (block 404). The user may then navigate through the representations of the images 512 to locate an image of interest.

At the third stage 506, a user interacting with the client device 110 makes an image selection 514 and provides credentials 516 usable to license use of the selected image. Although the credentials 516 are illustrated as being communicated along with the image selection 514, the credentials 516 may be provided at any time, such as during initial login to the content sharing service 104 by the user. Responsive to provision of the credentials 516 that are verifiable for licensing of at least one of the images from the content sharing service, a package 518 is received that includes the at least one image 126 along with image creation functionality data 218 that describes image creation functionality that is used to create the at least one image 126 and usable continue use of the image creation functionality as part of creation of the content (block 406).

Figure 6:
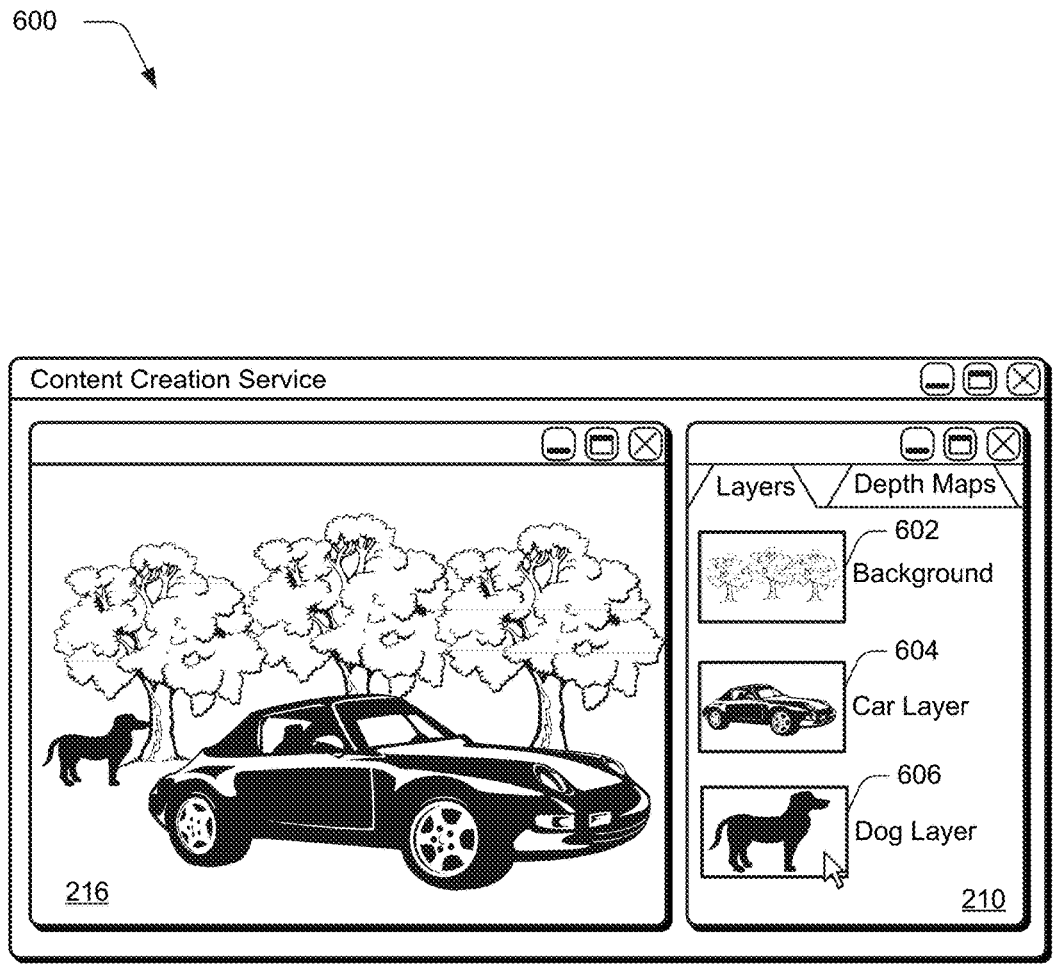
FIG. 6 depicts a user interface including examples of modifiable content obtained from a content sharing service.

As shown in an example user interface 600 of FIG. 6, for instance, a user interacts with a content creation service 102 to create content, such as a marketing banner ad. As part of this, the user obtains an image 216 from the content sharing service 104 having a modifiable format in that image creation functionality used to create the image 216 is preserved as part of the package 518. In the illustrated example, layers 210 of the image 216 are preserved that include a background 602, car layer 604, and a dog layer 606. In this way, a user may continue content creation using a modifiable version of the image, such as to select a dog layer 606 for inclusion of the dog as part of content without reprocessing the image 216 to extract the dog from the image by leveraging the image creation functionality data 218.

In one or more implementations, user interaction with the image creation functionality data 218 is monitored and leveraged to support a variety of functionality. Returning again to FIG. 2, image usage data 222 describing this interaction is provided back to a content creation professional that created the image 216. In this way, the creative professional is made aware as to how the image 216 and more particularly part of the image are used, which may be used to guide subsequent content creation.

This image usage data 222 may also be exposed via the content sharing service 104 and/or the content creation service 102 to other users to guide creation of their content, act as a guide for what is popular within the images, and so on. For example, the image usage data 222 may describe modifications made to the image 216 which may then be used by creative professionals to perform such modifications on subsequently generated content to improve a likelihood that the images will be desired by user of the content sharing service 104. Use of image creation functionality on the part of a user to create content may also be leveraged to search for similar content, further discussion of which is included in the following and shown in corresponding figures.

Figure 7:
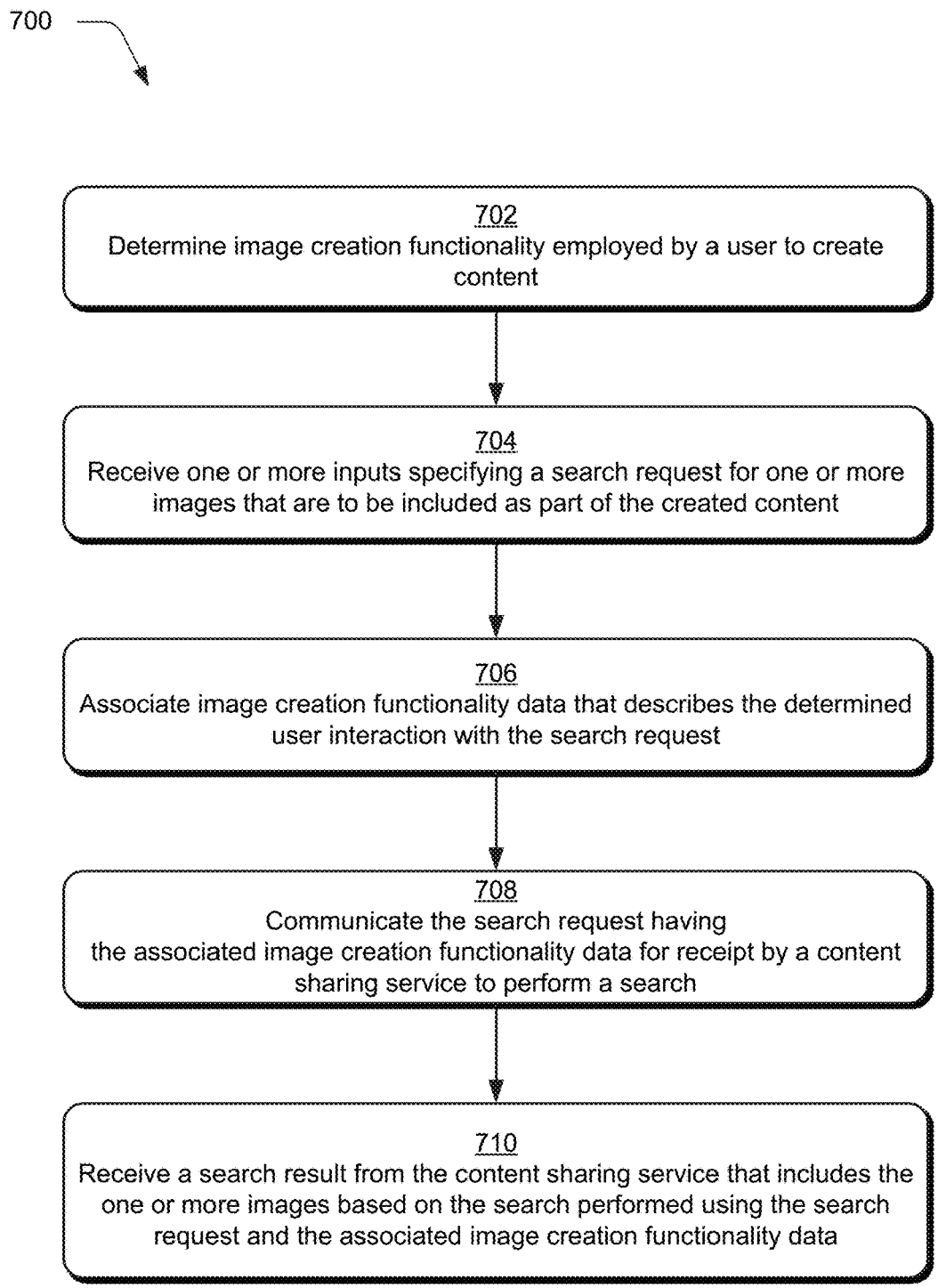

FIG. 7 depicts a procedure 700 and FIG. 8 depicts a system 800 in an example implementation in which image creation functionality employed as part of content creation is leveraged in an image search. FIG. 8 is depicted using first, second, and third stages 802, 804, 806. In the following, reference is made interchangeably to both FIGS. 7 and 8.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

At first, a determination is made as to which content creation functionality is employed by a user to create content (block 702). This determination is performable in a variety of ways as shown at the first stage 802. In one such example, the content creation manager module 114 monitors user interaction of a client device 110 with image creation functionality 202. This includes a determination as to which functionality is actually employed by a user in creation of content. In another example, this determination is based on which functionality is selected for display in the user interface 300 for image creation, such as which color palettes are displayed, and thus this other example the image creation functionality 202 is selected but not necessarily utilized by a user. A variety of other examples are also contemplated to collect data that describes "what the user is working on."

One or more inputs are received that specify a search request 808 for one or more images that are to be included as part of the content (block 704). A user, for instance, may input one or more keywords that are to be matched to tags of images of the content sharing service 104. Image creation functionality data 218 is associated with the search request 808 that describes the determined user interaction (block 706), such as automatically by the communication module 126 and/or a content creation manager module 114. The search request 808 having the associated image creation functionality data 218 is then communication for receipt by a content sharing service to perform a search (block 708), which may be performed by the content creation service 102 as shown at the second stage 804 and/or directly from the client device 110.

A search result 810 is received from the content sharing service that includes the one or more images 812 (e.g., which may be configured as representations thereof that are selectable for licensing as described above) based on the search performed using the search request 808 and the associated image creation functionality data 218 (block 710). The sharing manager module 118, for instance, may be configured to find corresponding color palettes 204, image filters 206, semantic labels 208, layers 210, tools 212, depth maps 214 and so on that are used to create the images 812. These images 812 are then included as part of the search result 810 such that a creative professional is provided with images having a similar "look and feel" to the content being created by the professional. In one or more implementations, the images 812 are included as part of packages 518 (either directly or through selection of a representation) such that a user is provided with readily modifiable images as described above.

Example System and Device

Figure 9:
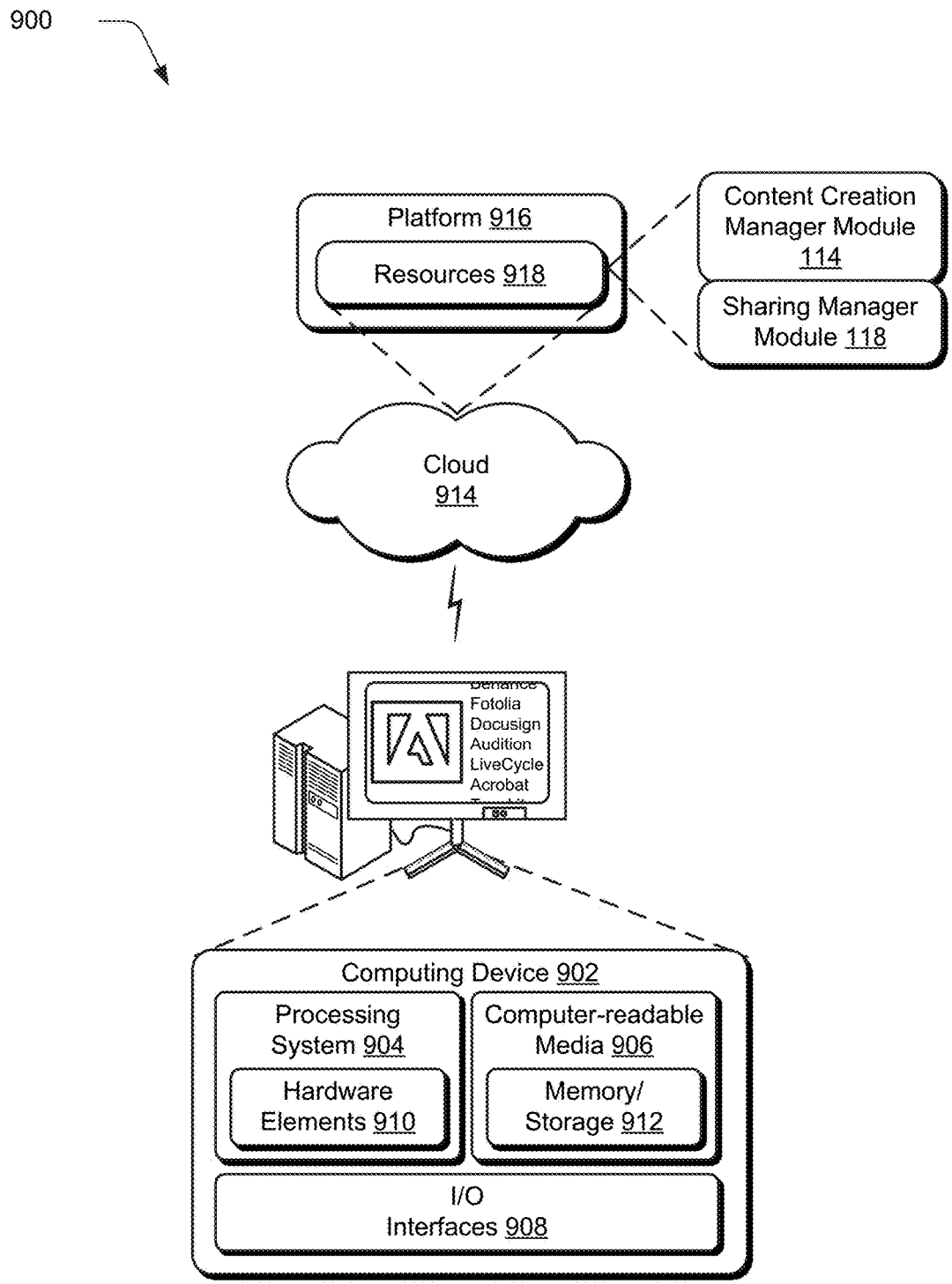
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the sharing manager module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for locating one or more images for inclusion as part of content, a method comprising:
   receiving one or more inputs specifying a search request for one or more images that are to be included as part of content creation, the one or more inputs received from the user by a client device;
   responsive to communication of the search request to a content sharing service via a network, receiving a search result by the client device from the content sharing service that includes a representation of at least one image as available for licensing based on the search performed using the search request, the at least one image being associated with image creation functionality data preserved during image creation of the at least one image with a content creation service, the image creation functionality data describing a context of the user's interaction with the content creation service to create the at least one image;
   responsive to provision of credentials that are verifiable for licensing of the at least one image from the content sharing service, receiving a package via the network that includes the at least one image along with the image creation functionality data, the image creation functionality data identifying layers formed as part of the at least one image;
   receiving, at the client device, user input to interact with an individual object of the at least one image using the layers of the image creation functionality data and
   in response to user input to interact with the individual object, utilizing the image creation functionality data to modify the individual object or extract the individual object from the at least one image.

2. The method as described in claim 1, wherein the image creation functionality includes color palettes used as a basis to select colors for inclusion as part of the at least one image and the image creation functionality data references colors of the color palette used to create the at least one image or the color palette itself used to create the at least one image.

3. The method as described in claim 1, wherein the image creation functionality includes one or more image filters that are applied to the at least one image to transform an appearance of the at least one image and the image creation functionality data identifies the one or more image filters used to create the at least one image.

4. The method as described in claim 1, wherein the image creation functionality data includes semantic labels that identify pixels as relating to objects included in the at least one image.

5. The method as described in claim 1, wherein the image creation functionality identifies one or more image creation tools used to create the at least one image including user selection tools, color selection tools, cropping tools, slicing tools, clone stamping tools, brush tools, pencil tools, gradient tools, blur tools, dodge tools, path selection tools, pen tools, or foreground color change tools.

6. The method as described in claim 1, wherein the image creation functionality data includes a depth map that describes relative or absolute depth of one or more objects included in the at least one image.

7. The method as described in claim 1, wherein the licensing includes purchase of the at least one image.

8. The method as described in claim 1, wherein the image creation functionality data is made available for licensing with the at least one image.

9. In a digital medium environment for controlling image search and availability of images for licensing as part of a content sharing service by one or more computing devices, a method comprising:
receiving a search request, originated by a client device, by the one or more computing devices of the content sharing service;
generating a search result for communication to the client device by the one or more computing devices of the content sharing service based on the search request, the search result including a representation of at least one image as available for licensing based on the search performed using the search request, the at least one image being associated with image creation functionality data preserved during image creation of the at least one image with a content creation service; and
responsive to receipt of credentials from the client device that are verified for licensing of the at least one image, forming a package for communication to the client device that includes the at least one image along with the image creation functionality data, the image creation functionality data describing a context of a user's interaction with a content creation service to create the at least one image and enabling user interaction with an individual object of the at least one image at the client device.

10. The method as described in claim 9, wherein the image creation functionality includes color palettes used as a basis to select colors for inclusion as part of the at least one image and the image creation functionality data references colors of the color palette used to create the at least one image or the color palette itself used to create the at least one image.

11. The method as described in claim 9, wherein the image creation functionality includes one or more image filters that are applied to the at least one image to transform an appearance of the at least one image and the image creation functionality data identifies the one or more image filters used to create the at least one image.

12. The method as described in claim 9, wherein the image creation functionality data includes semantic labels that identify pixels as relating to objects included in the at least one image.

13. The method as described in claim 9, wherein the image creation functionality data identifies one or more layers formed as part of the at least one image, and wherein the one or more layers enable interaction with individual objects within the at least one image.

14. The method as described in claim 9, wherein the image creation functionality identifies one or more image creation tools used to create the at least one image including user selection tools, color selection tools, cropping tools, slicing tools, clone stamping tools, brush tools, pencil tools, gradient tools, blur tools, dodge tools, path selection tools, pen tools, or foreground color change tools.

15. The method as described in claim 9, wherein the image creation functionality data includes a depth map that describes relative or absolute depth of one or more objects included in the at least one image.

16. In a digital medium environment for controlling image search and availability of images for licensing as part of a content sharing service, a system comprising one or more computing devices configured to perform operations comprising:
generating a search result for communication to a client device based on a search request originated by the client device, the search result including representations of at least one image as available for licensing based on the search performed using the search request, the at least one image being associated with image creation functionality data preserved during image creation of the at least one image with a content creation service, the image creation functionality data describing a context of a user's interaction with a content creation service to create the at least one image; and
responsive to receipt of credentials from the client device that are verified for licensing of the at least one image, forming a package for communication to the client device that includes the at least one image along with the image creation functionality data.

17. The system as described in claim 16, wherein the image creation functionality includes color palettes used as a basis to select colors for inclusion as part of the at least one image and the image creation functionality data references colors of the color palette used to create the at least one image or the color palette itself used to create the at least one image.

18. The system as described in claim 16, wherein the image creation functionality includes one or more image filters that are applied to the at least one image to transform an appearance of the at least one image and the image creation functionality data identifies the one or more image filters used to create the at least one image.

19. The system as described in claim 16, wherein the image creation functionality data includes semantic labels that identify pixels as relating to objects included in the at least one image or identifies one or more layers formed as part of the at least one image.

20. The system as described in claim 16, wherein the operations further comprise communicating the package to the client device to enable user interaction with the at least one image by utilizing the image creation functionality data.

* * * * *